3,184,522
BLENDS OF ETHYLENE POLYMER AND BUTYL RUBBER
Walter T. Zagar, Midland Park, N.J., assignor to W. R. Grace & Co., a corporation of Connecticut
No Drawing. Filed Oct. 26, 1961, Ser. No. 147,751
10 Claims. (Cl. 260—889)

The present invention relates to a novel and useful composition, a process employing such a composition and the product resulting from the process. More particularly, it relates to a high density ethylene polymer composition containing butyl rubber, a vulcanization or curing process employing such a composition and the resulting product.

It is known in the art that the properties of polymeric materials may be modified by the physical blending or chemical interaction between different types of polymers. It is further known that high density ethylene polymers can be physically blended with polyisobutylene to give a product with improved properties (United States Patent 2,993,876). However, polyisobutylene is relatively expensive and physical blends containing such mixtures reflect the expensive component in the selling price and particularly so when the composition contains a substantial amount of this ingredient. For this reason, many attempts have been made to find cheaper components for such blends. Such attempts have generally resulted in failure, for when other materials are blended with the high density ethylene polymers, inferior final properties are generally obtained.

In contrast to the blended composition of the aforementioned patent, it is an object of the present invention to provide a composition which employs a cheaper component which is easily vulcanizable or cured to a product having improved properties. A further object of the invention is to provide a vulcanization or curing process which may be carried out using conventional techniques. A still further object is to provide a shaped structure with improved properties. Another object is to provide a film which is particularly resistant to breakage in bag form. Other objects will become apparent as the description of the invention proceeds.

These objectives are accomplished by the present invention which provides a composition comprising (A) a mixture of polymers, said mixture containing (1) from about 60 to about 85% by weight of an ethylene polymer having a density of from about 0.945 to about 0.970, a melt index of from about 0.1 to about 3.0 and containing up to about 5% of an α-olefine copolymerized with the ethylene and (2) from about 15 to about 40% by weight of butyl rubber having a molecular weight of from about 150,000 to about 600,000 and (B) from about 0.05 to about 5%, by weight based on said mixture, of a vulcanization accelerator for rubber.

The present invention also provides a process whereby the above composition is heated to a temperature above the melting point of the composition which may then be shaped and quenched to form a shaped article. The shaped article may take the form of granules, particles, films, fibers, tubes and the like. In general, a temperature of approximately 260° F. to 500° F. will generally be employed with a heating time of from about ¼ to 30 minutes depending on the particular composition and temperature employed.

The present invention also provides the shaped structure resulting from the above described process, preferably in the form of a film which is particularly desirable in the formation of plastic bags which are to be utilized for products which require a high impact resistance such as fertilizer bags.

The term "composition" signifies either a simple mixture of the components or such components in their partially or completely vulcanized or cured state.

The expression "an ethylene polymer having a density of from about 0.945 to about 0.970, a melt index of from about 0.1 to about 3.0 and containing up to about 5% of an α-olefine copolymerized with the ethylene" is used to signify high density ethylene polymers having a relatively low melt index, which may randomly contain in the polymer chain up to about 5% of an alpha-olefin copolymerized with the ethylene. Preferably, the ethylene polymer has a density of from about 9.50 to about 9.65, a melt index of from about 0.2 to about 1.0, and is a copolymer containing about 1% or less of 1-butene.

The terminology "butyl rubber" is used in its conventional sense to mean a copolymer of isobutylene and a small amount, generally from 1 to 5%, of isoprene. Butyl rubber is generally prepared by copolymerizing the copolymers at a low temperature, e.g., −25 to −150° F., in the presence of a Friedel-Crafts catalyst. The method of measuring the molecular weight of the butyl rubber is hereinafter described and is important for the numerical value varies somewhat depending upon the particular method employed for the determination. In general, however, it can be said that the molecular weight of the butyl rubber employed in the present invention is in the range of the normally available butyl rubbers.

The term "vulcanization accelerator for rubber" is used in its broad sense, as in the rubber industry, to encompass those materials which speed up what is referred to as the vulcanization or curing of the rubber molecules. Such materials are well known in the art and fall within four basic categories; the mercaptothiazoles and derivatives, the dithiocarbamates and bis(thiocarbamoyl)sulfides (commonly known as thiuram sulfides), guanidines and aldehyde-amine reaction products. Another group comprises other classes of minor importance, such as the xanthates, thioureas and mercaptothiazolines. While the exact mechanism of the accelerator action is not specifically known, the aforementioned classes of materials are known to have an accelerating action for the vulcanization of rubber and are accordingly operable in the present invention. Typical accelerators are disclosed in the "Encyclopedia of Chemical Technology," vol. 11, pp. 871–878 (1953), which is hereby incorporated by reference. A particularly preferred class of accelerators is the group generally known as thiuram sulfides.

In addition to employing the required accelerator in the system, one may optionally employ known activators for the accelerators such as zinc oxide, etc., which serve to further speed up the vulcanization or curing action. One may also employ the various antioxidants to prevent degradation of the material while vulcanization or curing is taking place. Such materials are described in the aforementioned encyclopedia on pp. 871, 881–883, and 888. Such materials may be employed in the small amounts required for the activity, generally less than 10%, but in some instances and particularly with zinc oxide they may serve as a filler and be employed in amounts of up to about 20% by weight of the total material.

The phraseology "a temperature above the melting point of said mixture" is used to signify any temperature above which the ethylene polymer becomes substantially fluid and below that at which substantial decomposition of the mixture takes place. While the melting point, actually it is a temperature range, will depend upon the proportions of butyl rubber and ethylene polymer as well as the type of materials employed in the composition, in general, the temperatures utilized will be in the range of about 260 to 500° F., with a shorter time being required at the more elevated temperature which is well above the melting point of the polyethylene. Vulcanization is generally complete within 30 minutes at 260° F. and ¼ minute or so at 500° F. although some decomposition may take place at the higher temperature with some compositions. A particularly preferred method of vulcanizing the mixture is to heat it in a Banbury mixer at a temperature of about 325° F. for approximately 5 minutes. The vulcanization step may take place prior to the formation of the shaped article or it may take place simultaneously with the formation of the shaped article.

The expressions "shaping the molten mixture" and "quenching the molten mixture to form a shaped article" are used to merely signify that the mixture is formed into a predetermined shape and solidified by cooling it below the melting point. The "shaped article" may take the form of a film, a pellet, a tube, a sheet, or any other desired form.

Other antioxidants may also be employed in the compositions and among the suitable antioxidants are para-benzyloxyphenol; ditolyamines with selected petroleum waxes; phenyl-beta-naphthylamine; 2,6-ditertiary butyl-p-cresol; 4,4'-thiobis(6-tertiary butyl-M-cresol); 4,4'-butylidene(6-tertiary butyl-M-cresol); N-n-butyl-p-aminophenol and N-n-pelargonyl-p-aminophenol. Such materials are well known in the art and may be selected at random.

In the specification and claims all parts are given in parts by weight unless otherwise expressed. The melt index is determined by the standard ASTM D-1238-52T test and is reported in decigrams per minute. The density is given in grams per cubic centimeter at 23° C. as measured in a density gradient column such as that described in "Journal of Polymer Science," vol. 21, p. 144 (1956). The molecular weight of butyl rubber is measured according to the procedure set forth in "Industrial and Engineering Chemistry," vol. 38, p. 417 (1946).

The following examples are given to illustrate the invention and are not intended to limit it in any manner.

The high density ethylene polymers employed in the examples are prepared according to the United States Patent 2,825,721 employing a pressure of about 450 p.s.i.g., a reaction time of 2 hours, a temperature of from about 260 to about 310° F., and chromium oxide supported on silica/alumina as the catalyst.

The Elmendorf Test is the conventional tear-strength test as employed in the paper industry and is expressed in grams per mil of transverse and machine direction, respectively.

The "Dart Impact" value is the weight in grams of a "projectile" which, when dropped from a height of 60 inches, will fracture 50% of the film samples tested (10 specimens). The "projectile" has a spherical bottom and a shaft opposite the bottom for attaching additional weights. Thus the "projectile" always presents a constant contact area with the test specimen.

*Example I*

A high density ethylene copolymer containing approximately 1% of 1-butene copolymerized with the ethylene is prepared as previously described so as to give a copolymer having a density of 0.950 and a melt index of 0.28. 227 parts of the high density ethylene copolymer are mixed with 100 parts of butyl rubber having an average molecular weight of about 510,000 and containing about 1.5% of isoprene comonomer. To the mixture is added 0.9 part of a thiuram sulfide vulcanization accelerator dipentamethylene thiuram tetrasulfide and 0.9 part of para-benzyloxyphenol as an anti-oxidant.

The resulting mixture is heated to a temperature of about 325° F. and mixed in a Banbury mixer for approximately 5 minutes, at which time vulcanization is substantially complete. The molten polymer is pelletized and melt extruded through a circular die employing the known film blowing technique as described in United States Patent 2,825,721, col. 35, to give a tubular film having a thickness of approximately 4 mils.

The Elmendorf Tear Strengths of the resulting film are T.D. 412, M.D. 74 and the Dart Impact value is 350.

When the above procedure is repeated employing a high density polyethylene homopolymer having a density of 0.965 and a melt index of 0.2, omitting, however, the zinc oxide and the anti-oxidant, substantially the same results are obtained with a mixing time of 10 minutes.

*Example II*

Example I is repeated employing 100 parts of the butyl rubber, 227 parts of the high density ethylene copolymer, 3.64 parts of zinc oxide, 0.45 part of sulfur, 0.45 part of dipentamethylene thiuram tetrasulfide and 0.9 part of para-benzyloxyphenol as an anti-oxidant.

When processed into a film according to the procedure of Example I, the Elmendorf Tear Strengths of the resulting film are T.D. 443, M.D. 79 and the Dart Impact value is 339.

When the procedure is repeated employing a polyethylene homopolymer (prepared as previously described at a temperature of about 275° F.) having a density of 0.960 and a melt index of 0.8, substantially the same results are obtained.

*Example III*

Example I is repeated employing 100 parts of the butyl rubber, 227 parts of the high density ethylene copolymer, 3.64 parts of zinc oxide, 0.09 part of sulfur, 0.09 part of dipentamethylene thiuram tetrasulfide and 0.9 part of para-benzyloxyphenol as an anti-oxidant.

When processed into a film according to the procedure of Example I, the Dart Impact value is 295.

When the procedure is repeated employing a polyethylene homopolymer (prepared as previously described at a temperature of about 290° F.) having a density of 0.960 and a melt index of 2.8 and about 15% by weight of butyl rubber, based on the total polymer content, substantially the same results are obtained.

*Example IV*

In the preceding examples a thiuram sulfide accelerator is employed. In order to demonstrate that the other 3 basic types of accelerators can be employed in the practice of the invention, Example II is repeated using a mercaptothiazole (2-mercaptobenzothiazole), a guanidine (1,3-diphenylguanidine) and an aldehyde-amine reaction product (butyraldehyde-aniline condensation product—most active component: 1-phenol-3,5-diethyl-2-n-propyl-1,4-dihydropyridine) in place of the thiuram sulfide accelerator.

The properties of the films obtained employing these accelerators are substantially the same as those obtained in Example II. When considering cheapness, activity, ease of fabrication, vulcanization or curing time, and the properties of the final product, however, the thiuram sulfides are preferred.

*Example V*

Example I is repeated employing an alkylated-phenol/styrenated-phenol type anti-oxidant ("Agerite Spar").

The Elmendorf Tear Strengths of the resulting film are T.D. 413, M.D. 77 and the Dart Impact value is 356.

Many other equivalent modifications will be apparent to those skilled in the art from a reading of the foregoing without a departure from the inventive concept.

What is claimed is:

1. A composition consisting of (A) a mixture of polymers, said mixture containing (1) from about 60 to about 85% by weight of an ethylene copolymer having a density of from about 0.945 to about 0.970, a melt index of from about 0.1 to about 3.0 and containing at least about 95% of ethylene and up to about 5% another of an $\alpha$-olefine copolymerized with the ethylene and (2) from about 15 to 40% by weight of butyl rubber containing 95–99% isobutylene and 1–5% of isoprene and having a molecular weight of from about 150,000 to about 600,000 and (B) from about 0.05 to about 5%, by weight based on said mixture, of a vulcanization accelerator for rubber selected from the group consisting of mercaptothiazoles, dithiocarbamates, bis(thiocarbamoyl) sulfides, guanidines, aldehyde-amine reaction products, xanthates, thioureas and mercaptothiazolines.

2. The composition of claim 1 wherein the α-olefine is 1-butene.

3. The composition of claim 1 wherein an ethylene copolymer is present in amounts of from about 65 to 75% and the vulcanization accelerator is present in amounts of from about ½ to 2%.

4. The composition of claim 2 wherein an ethylene copolymer is present in amounts of from about 65 to 75% and the vulcanization accelerator is present in amounts of from ½ to about 2%.

5. A composition consisting of (A) a mixture of polymers, said mixture containing (1) about 70% by weight of an ethylene copolymer having a density of from about 0.945 to about 0.970, a melt index of from about 0.2 to about 1.0 and containing about 99% ethylene and about 1% of 1-butene copolymerized with the ethylene and (2) about 30% by weight of butyl rubber containing 95–99% isobutylene and 1–5% of isoprene and having a molecular weight of from about 150,000 to about 600,000 and (B) from about 0.5 to about 2%, by weight based on said mixture, of a vulcanization accelerator for rubber selected from the group consisting of mercaptothiazoles, dithiocarbamates, bis(thiocarbamoyl) sulfides, guanidines, aldehyde-amine reaction products, xanthates, thioureas and mercaptothiazolines.

6. A process which comprises heating a composition consisting of (A) a mixture of polymers, said mixture containing (1) from about 60 to about 85% by weight of an ethylene copolymer having a density of from about 0.945 to about 0.970, a melt index of from about 0.1 to about 3.0 and containing at least about 95% of ethylene and up to about 5% of another an α-olefine copolymerized with the ethylene and (2) from about 15 to 40% by weight of butyl rubber containing 95–99% isobutylene and 1–5% of isoprene and having a molecular weight of from about 150,000 to about 600,000 and (B) from about 0.05 to about 5%, by weight based on said mixture, of a vulcanization accelerator for rubber selected from the group consisting of mercaptothiazoles, dithiocarbamates, bis(thiocarbamoyl) sulfides, guanidines, aldehyde-amine reaction products, xanthates, thioureas and mercaptothiazolines, to a temperature above the melting point of said mixture, shaping the molten mixture and thereafter quenching the molten mixture to form a shaped article.

7. The process of claim 6 wherein the α-olefine is 1-butene.

8. The process of claim 6 wherein the ethylene copolymer is present in amounts of from about 65 to 75% and the vulcanization accelerator is present in amounts of from about ½ to about 2%.

9. The process of claim 7 wherein the ethylene copolymer is present in amounts of from about 65 to 75% and the vulcanization accelerator is present in amounts of from about ½ to about 2%.

10. A process which comprises heating a composition consisting of (A) a mixture of polymers, said mixture containing (1) about 70% by weight of an ethylene copolymer having a density of from about 0.945 to about 0.970, a melt index of from about 0.2 to about 1.0 and containing about 99% ethylene and about 1% of 1-butene copolymerized with the ethylene and (2) about 30% by weight of butyl containing 95–99% isobutylene and 1–5% of isoprene and rubber having a molecular weight of from about 150,000 to about 600,000 and (B) from about 0.5 to about 2%, by weight based on said mixture, of a vulcanization accelerator for rubber selected from the group consisting of mercaptothiazoles, dithiocarbamates, bis(thiocarbamoyl) sulfides, guanidines, aldehyde-amine reaction products, xanthates, thioureas and mercaptothiazolines, to a temperature above the melting point of said mixture shaping the molten mixture and thereafter quenching the molten mixture to form a shaped article.

References Cited by the Examiner

UNITED STATES PATENTS

| | | | |
|---|---|---|---|
| 2,631,954 | 3/53 | Bright | 260—5 |
| 2,993,876 | 7/61 | McGlamery | 260—897 |
| 2,997,453 | 8/61 | Short et al. | 260—889 |
| 3,010,916 | 11/61 | Pooley | 260—889 |
| 3,076,777 | 2/63 | Zealla et al. | 260—889 |
| 3,123,583 | 3/64 | Howard et al. | 260—889 |

FOREIGN PATENTS

| | | |
|---|---|---|
| 1,219,247 | 12/59 | France. |
| 1,079,146 | 4/60 | Germany. |

MURRAY TILLMAN, *Primary Examiner.*

L. J. BERCOVITZ, WILLIAM H. SHORT, *Examiners.*

UNITED STATES PATENT OFFICE

CERTIFICATE OF CORRECTION

Patent No. 3,184,522   May 18, 1965

Walter T. Zagar

It is hereby certified that error appears in the above numbered patent requiring correction and that the said Letters Patent should read as corrected below.

Column 2, line 19, for "-25" read ---125 --; column 6, li: 20, for "butyl" read -- butyl rubber --; line 21, strike out "rubber".

Signed and sealed this 5th day of April 1966.

(SEAL)
Attest:

ERNEST W. SWIDER
Attesting Officer

EDWARD J. BRENNEF
Commissioner of Patents